(12) United States Patent
Liu et al.

(10) Patent No.: US 7,701,177 B2
(45) Date of Patent: Apr. 20, 2010

(54) BATTERY PRE-CHARGING CIRCUIT COMPRISING NORMAL VOLTAGE AND LOW VOLTAGE PRE-CHARGING CIRCUITS

(75) Inventors: Shiqiang Liu, Chengdu (CN); Guoxing Li, Sunnyvale, CA (US); Sean Xiao, Shanghai (CN); Liusheng Liu, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 355 days.

(21) Appl. No.: 11/644,314

(22) Filed: Dec. 21, 2006

(65) Prior Publication Data
US 2008/0150487 A1    Jun. 26, 2008

(51) Int. Cl.
H02J 7/04    (2006.01)
H02J 7/16    (2006.01)
H02J 7/00    (2006.01)

(52) U.S. Cl. .................. 320/162; 320/132; 320/134
(58) Field of Classification Search .............. 320/127, 320/128, 134, 137, 160, 162, 163, 164, 132; 324/426, 432, 433
See application file for complete search history.

(56) References Cited

U.S. PATENT DOCUMENTS 6,194,871 B1    2/2001    Haraguchi et al.

2005/0134222 A1 *    6/2005    Stinson ................ 320/128
2005/0212489 A1 *    9/2005    Denning et al. ........... 320/134
2006/0181244 A1 *    8/2006    Luo et al. ................ 320/128
2006/0255768 A1 *    11/2006    Yoshio ................... 320/134
2008/0074080 A1    3/2008    Luo et al. ................ 320/132

FOREIGN PATENT DOCUMENTS

JP    H05-276682    10/1993
JP    2001-169463    6/2001
JP    A2001333542    11/2001

OTHER PUBLICATIONS

English translation of abstract of JP H05-276682 (1 page).
English translation of first Office Action for JP 2007-108609 dated Feb. 3, 2009 (5 pages).

* cited by examiner

Primary Examiner—Edward Tso
Assistant Examiner—Ahmed Omar (57) ABSTRACT

A battery pre-charging circuit includes a pre-charging path, a pre-charging switch and a low-voltage pre-charging circuit. The pre-charging path is coupled between a charger and a battery for providing a pre-charging current from the charger to the battery. The pre-charging switch is coupled to the pre-charging path for conducting along the pre-charging path. The low-voltage pre-charging circuit is coupled to the pre-charging switch for controlling the pre-charging switch. The low-voltage pre-charging circuit is configured to switch on the pre-charging switch when the battery voltage is below a first battery voltage level.

17 Claims, 7 Drawing Sheets

BATTERY PRE-CHARGING CIRCUIT COMPRISING NORMAL VOLTAGE AND LOW VOLTAGE PRE-CHARGING CIRCUITS

TECHNICAL FIELD

This invention relates to a battery protection circuit, and more particularly to a battery pre-charging circuit.

BACKGROUND ART

In a typical high power battery protection circuit, a charging switch and a discharging switch are employed to control the charging loop and the discharging loop, respectively. In addition, an external resistor and a pre-charging switch are used for pre-charging purposes.

Figure 1:
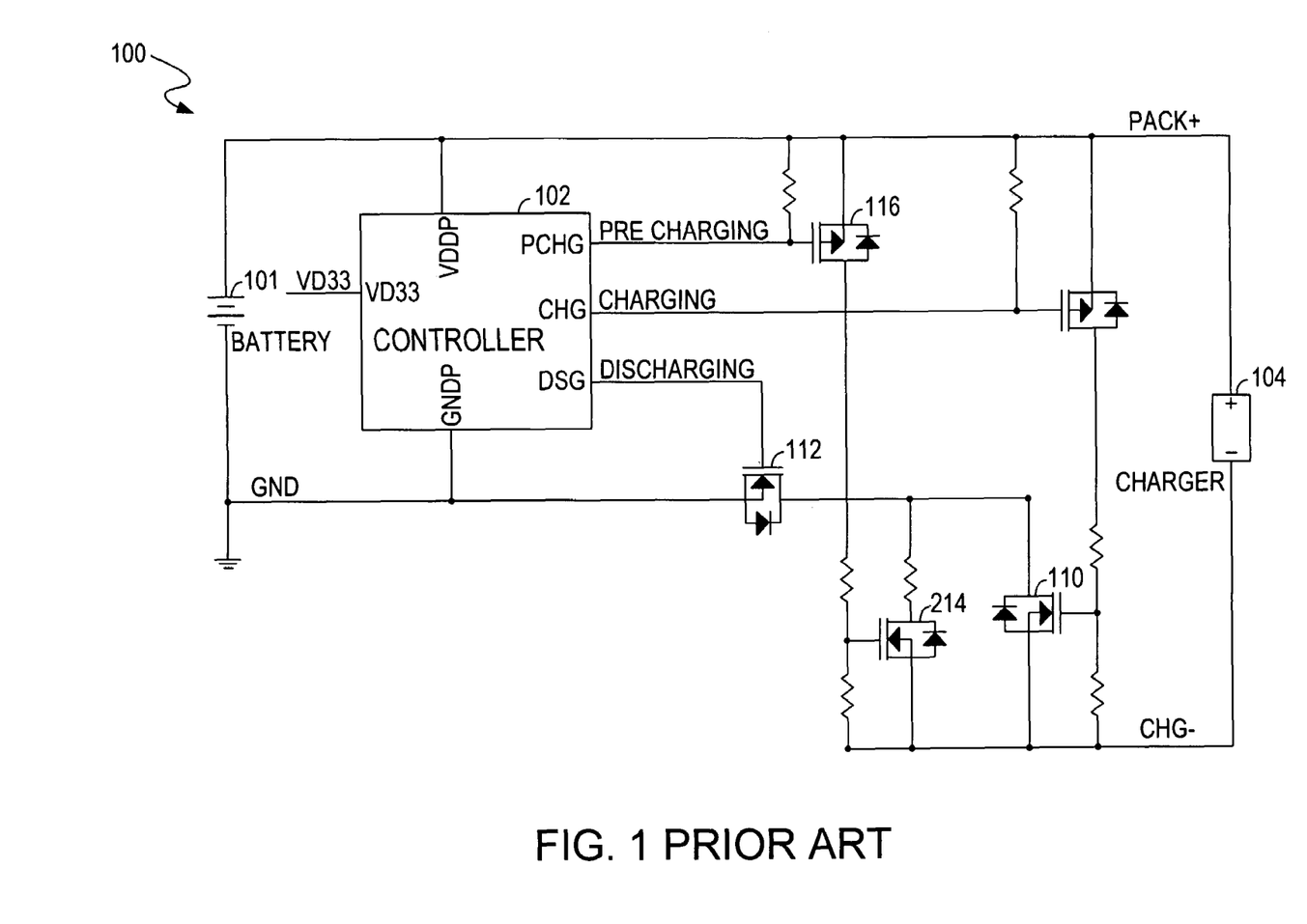
FIG. 1 shows a typical battery protection circuit able to perform pre-charge, in accordance with the prior art.

Prior Art FIG. 1 shows a typical battery protection circuit 100 able to perform pre-charge, in accordance with the prior art. The discharging switch 112 controls the discharging loop and the charging switch 110 controls the charging loop. The pre-charging switch 214 controls the pre-charging loop.

During pre-charging, the controller 102 sinks a current through the PCHG pin to switch on the switch 116. Therefore, the gate of the pre-charging switch is coupled to the positive terminal of the battery. As such, the pre-charging switch 214 is switched on accordingly to pre-charge the battery.

However, when the battery voltage is too low, the controller is not operable and is not able to sink enough current to switch on the switch 116. In other words, the pre-charging switch can not be switched on to pre-charge the battery when the battery voltage is too low or zero.

SUMMARY OF THE INVENTION

The present invention provides a battery pre-charging circuit. In accordance with one embodiment of the present invention, a pre-charging circuit comprises a pre-charging path, a pre-charging switch and a low-voltage pre-charging circuit. The pre-charging path is coupled between a charger and a battery for providing a pre-charging current from the charger to the battery. The pre-charging switch is coupled to the pre-charging path for conducting along the pre-charging path. The low-voltage pre-charging circuit is coupled to the pre-charging switch for controlling the pre-charging switch. The low-voltage pre-charging circuit is configured to switch on the pre-charging switch when a battery voltage is below a first battery voltage level.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Prior Art

DESCRIPTION OF EMBODIMENTS

Reference will now be made in detail to the embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
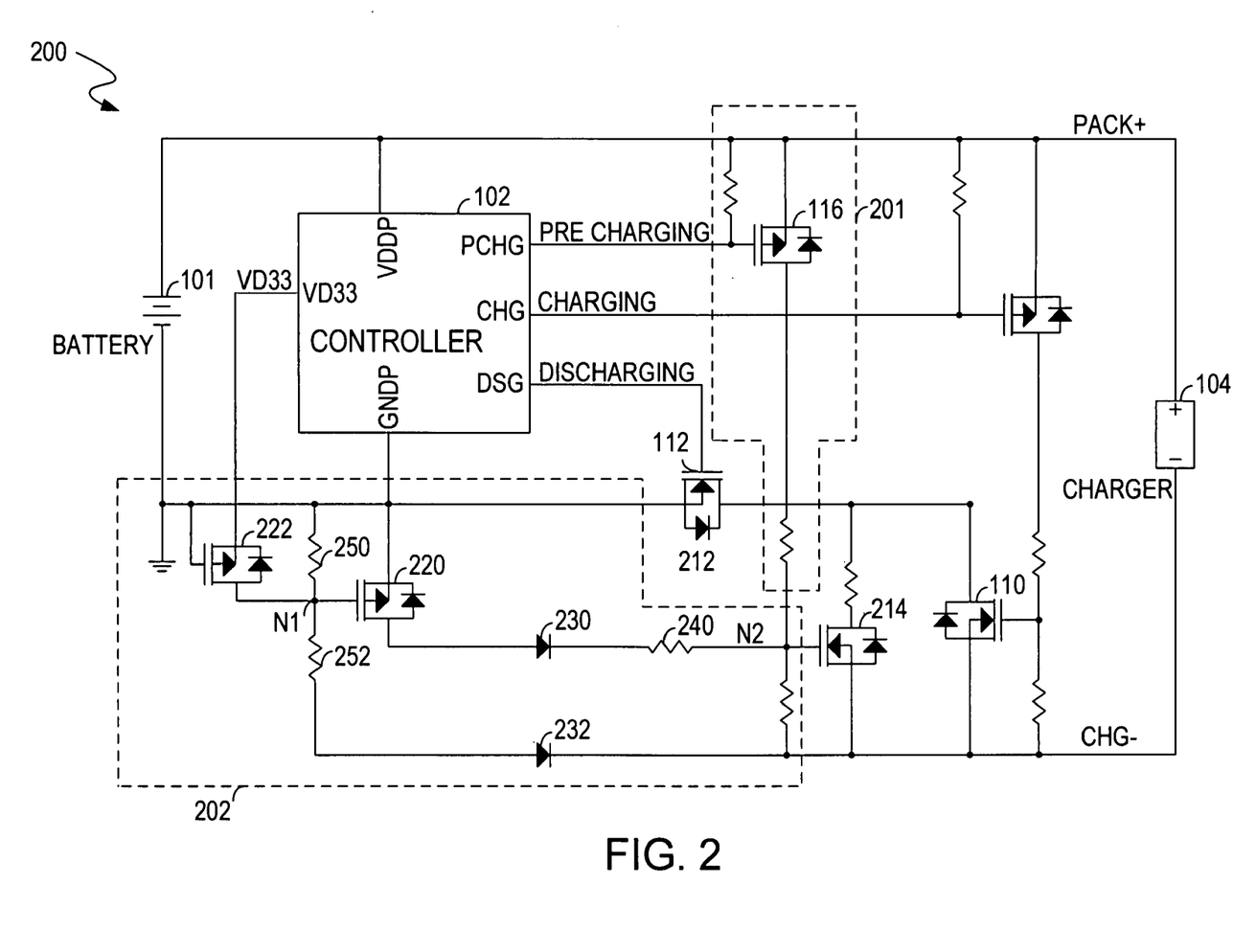
FIG. 2 shows a circuit diagram of a battery pre-charging circuit, in accordance with one embodiment of the present invention.

FIG. 2 shows a circuit diagram of a battery pre-charging circuit 200, in accordance with one embodiment of the present invention. The pre-charging circuit 200 comprises a battery 101, a charger 104 coupled to the battery 101, a pre-charging path coupled between the charger 104 and the battery 101 for providing a pre-charging current from the charger 104 to the battery 101, a pre-charging switch 214 coupled to the pre-charging path for conducting current along the pre-charging path, and a low-voltage pre-charging circuit 202.

The low-voltage pre-charging circuit 202 is coupled to the pre-charging switch 214 for controlling the pre-charging switch 214. More specifically, the low-voltage pre-charging circuit 202 is configured to switch on the pre-charging switch 214 when the battery voltage of the battery is below a first battery voltage level.

The pre-charging circuit 200 further comprises a normal pre-charging circuit 201. The normal pre-charging circuit 201 is also coupled to the pre-charging switch 214 for controlling the pre-charging switch 214. More specifically, the normal pre-charging circuit 201 is configured to switch on the pre-charging switch 214 when the battery voltage is above a second battery voltage level.

In one embodiment, the pre-charging path comprises the body diode 212 of the discharging switch 112, and the pre-charging switch 214. When the pre-charging switch 214 is switched on, the pre-charging current will flow through the charger 104, battery 101, body diode 212 and the pre-charging switch 214 to pre-charge the battery 101.

The pre-charging circuit 200 further comprises a controller 102 coupled to the normal pre-charging circuit 201 for conducting the normal pre-charging circuit 201 when the controller 102 is operable. It will be noted that the controller 102 is also used to control the charging switch 112 and the discharging switch 110. The detailed operation of the charging and discharging control are omitted herein for purposes of brevity and clarity.

The controller 102 is operable when the battery voltage is above the second battery voltage level (e.g., 4.5V for a Lithium-Ion battery pack). In other words, the normal pre-charging circuit 201 conducts current when the battery voltage is above the second battery voltage level.

The controller 102 comprises a power supply terminal VD33 having a supply voltage provided by the battery 101. The controller 102 is operable when the battery 101 supplies enough power to the power supply terminal VD33 of the controller 201. In one embodiment, the battery 101 is able to supply enough power to the controller 102 when the battery voltage is above the second battery voltage level. Thus, the controller 102 is able to sink enough current to switch on the switch 116 and the normal pre-charging circuit 201 conducts current. However, the controller 102 is not operable when the battery voltage is below the second battery voltage. As such, the controller 102 is not able to sink enough current to switch on the switch 116.

Advantageously, the low-voltage pre-charging circuit 202 conducts current when the battery voltage is below the first battery voltage level.

The low-voltage pre-charging circuit 202 comprises a first control switch 220 coupled to ground for controlling conductance of the low-voltage pre-charging circuit 202. In one embodiment, when the first control switch 220 is switched on, a current will flow from ground to switch 220, diode 230, resistor 240, to node N2. Therefore, when the first control switch 220 is switched on the low-voltage pre-charging circuit 202 conducts. As a result, the pre-charging switch 214 is switched on.

The low-voltage pre-charging circuit 202 further comprises a second control switch 222 coupled to the first control switch 220 for controlling the first control switch 220. In one embodiment, when the second control switch 222 is switched off, the first control switch 220 will be switched on.

As described above, the controller 102 comprises a power supply terminal VD33. The power supply terminal VD33 is coupled to the low-voltage pre-charging circuit 202 for controlling the second control switch 222.

In one embodiment, the second control switch 222 is a P channel MOSFET. When the supply voltage at the terminal VD33 is below the threshold voltage of the second control switch 222 (e.g., 2.5V), the second control switch 222 remains off. As described above, the supply voltage at the terminal VD33 is supplied by the battery 101. As such, in one embodiment, when the battery voltage is below a first battery voltage level (e.g., 3.5V for a Lithium-Ion battery pack), the supply voltage at the terminal VD33 is below the threshold voltage of the second control switch 222 (e.g., 2.5V). Therefore, the second control switch 222 is switched off when the battery voltage is below the first battery voltage, in one embodiment.

As discussed above, when the battery voltage is below the first battery voltage (that is, when the supply voltage at the terminal VD33 is below the threshold voltage of the second control switch 222), the second control switch 222 is switched off. Therefore, the voltage at node N1 is negative with respect to ground. In one embodiment, the first control switch 220 is a P channel MOSFET. As a result, the first control switch 220 will be switched on. Therefore, the first control switch 220 is switched on when the battery voltage is below the first battery voltage, in one embodiment.

In one embodiment, the pre-charging switch 214 is an N channel MOSFET. When the first control switch 220 is switched on, the voltage at the negative terminal CHG− of the charger 104 is negative with respect to the voltage at node N2. Therefore, the pre-charging switch 214 is switched on for conducting the pre-charging path.

In operation, when the battery voltage is above the second battery voltage, the normal pre-charging circuit 201 conducts current for controlling said pre-charging switch. When the battery voltage is below the first battery voltage level, the low-voltage pre-charging circuit 202 conducts current for controlling a pre-charging switch.

Normally, the controller 102 is operable when the supply voltage at terminal VD33 is above a supply voltage threshold, e.g., 3.3V. As long as the battery voltage is above the second battery voltage (e.g., 4.5V for a Lithium-Ion battery pack), the controller 102 is able to maintain the supply voltage at terminal VD33 above the supply voltage threshold (e.g., 3.3V). As such, the controller 102 will sink enough current at terminal PCHG to switch on the switch 116 in the normal pre-charging circuit 201. Once switch 116 is switched on, the pre-charging switch 214 will be switched on. The pre-charging path is conducted through the body diode 212 and the pre-charging switch 214. Therefore, the battery 101 is pre-charged by the normal pre-charging circuit 201 when the battery voltage is above the second battery voltage.

In contrast, when the battery voltage is below the second battery voltage (e.g., 4.5V for a Lithium-Ion battery pack), the supply voltage at terminal VD33 is below the supply voltage threshold (e.g., 3.3V). The controller 102 is not operable when the supply voltage at terminal VD33 is below the supply voltage threshold (e.g., 3.3V). As such, the battery 101 cannot be pre-charged by the normal pre-charging circuit 201 since the controller 102 is not operable.

As described above, the controller 102 is not operable and the battery 101 cannot be pre-charged by the normal pre-charging circuit 201 when the battery voltage is too low. However, in one embodiment, as long as the battery voltage is below the first supply voltage, the battery 101 can be pre-charged by the low-voltage pre-charging circuit 202.

More specifically, when the battery voltage is below the first battery voltage (e.g., 3.5V for a Lithium-Ion battery pack), the supply voltage at terminal VD33 is below the threshold voltage of the second control switch 222 (e.g., 2.5V). In one embodiment, the second control switch 222 is a P channel MOSFET. In this case, the second control switch 222 is switched off since its gate-source voltage is less than its threshold voltage. As such, the voltage at node N1 is negative with respect to ground and the first control switch (P channel MOSFET) 220 will be switched on.

Furthermore, the voltage at the negative terminal CHG− of the charger 104 is negative with respect to the voltage at node N2. As such, the pre-charging switch (N channel MOSFET) 214 is switched on to conduct the pre-charging path. The pre-charging path is conducted through the body diode 212 and the pre-charging switch 214. Therefore, the battery 101 is pre-charged by the low-voltage pre-charging circuit 202 when the battery voltage is below the first battery voltage.

Advantageously, in one embodiment, when the battery voltage drops to zero, the low-voltage pre-charging circuit 202 is still able to switch on the pre-charging switch 214 to pre-charge the battery 101.

In FIG. 2, the battery charging loop cannot be completely switched off at any time. There is always a charging current flowing from the charger 104, through battery 101, resistor 250, resistor 252, diode 232 back to the charger 104. In addition, when the charger 104 is present, there is a DC path from the terminal VD33 to ground through switch 222 and resistor 252.

Figure 3:
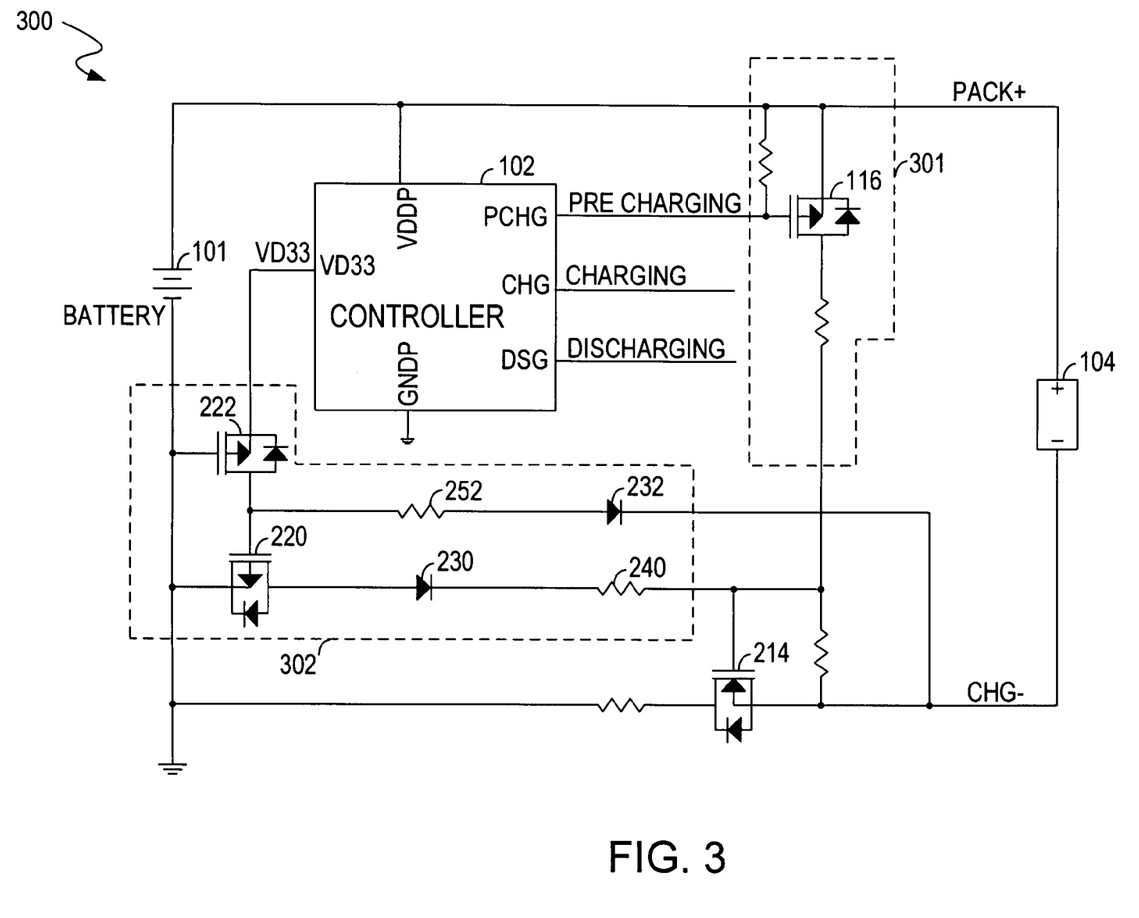
FIG. 3 shows another circuit diagram of a battery pre-charging circuit, in accordance with one embodiment of the present invention.

FIG. 3 shows a circuit diagram of a battery pre-charging circuit 300, in accordance with one embodiment of the present invention. The battery pre-charging circuit 300 removes the resistor 250 as shown in FIG. 2. All other elements and configurations are the same as shown in FIG. 2. Therefore, elements having similar functions as in FIG. 2 are labeled the same and will not be repetitively described herein for purposes of brevity and clarity. In addition, FIG. 3 only shows the normal pre-charging circuit 301 and the low-voltage pre-charging circuit 302. The charging and discharging loops are omitted herein for purposes of brevity and clarity.

Referring to FIG. 3, when the battery voltage is below the first battery voltage level, the supply voltage at terminal VD33 is below the threshold voltage of the second control switch (P channel MOSFET) 222. Therefore, the second control switch 222 is switched off and the first control switch (N channel MOSFET) 220 is switched on, in one embodiment. The pre-charging switch 214 is switched on to allow the pre-charging for the battery 101. Therefore, the low-voltage pre-charging circuit 302 switches on the pre-charging switch 214 when the battery voltage is below the first battery voltage level. The operation of the normal pre-charging circuit 301 is similar to the normal pre-charging circuit 201 in FIG. 2, hence repetitive descriptions are omitted herein for purposes of brevity and clarity.

Advantageously, by removing the resistor 250 shown in FIG. 2, the battery pre-charging circuit 300 in FIG. 3 removes the charging loop which could not be switched off as shown in FIG. 2.

However, in FIG. 3, when the second control switch 222 is switched off, the gate-source voltage of the first control switch 220 may be high. In addition, when the charger 104 is present, there is still a DC path from the terminal VD33 to ground through switch 222 and resistor 252. Other exemplary embodiments of the present invention are illustrated in FIG. 4 and FIG. 5.

Figure 4:
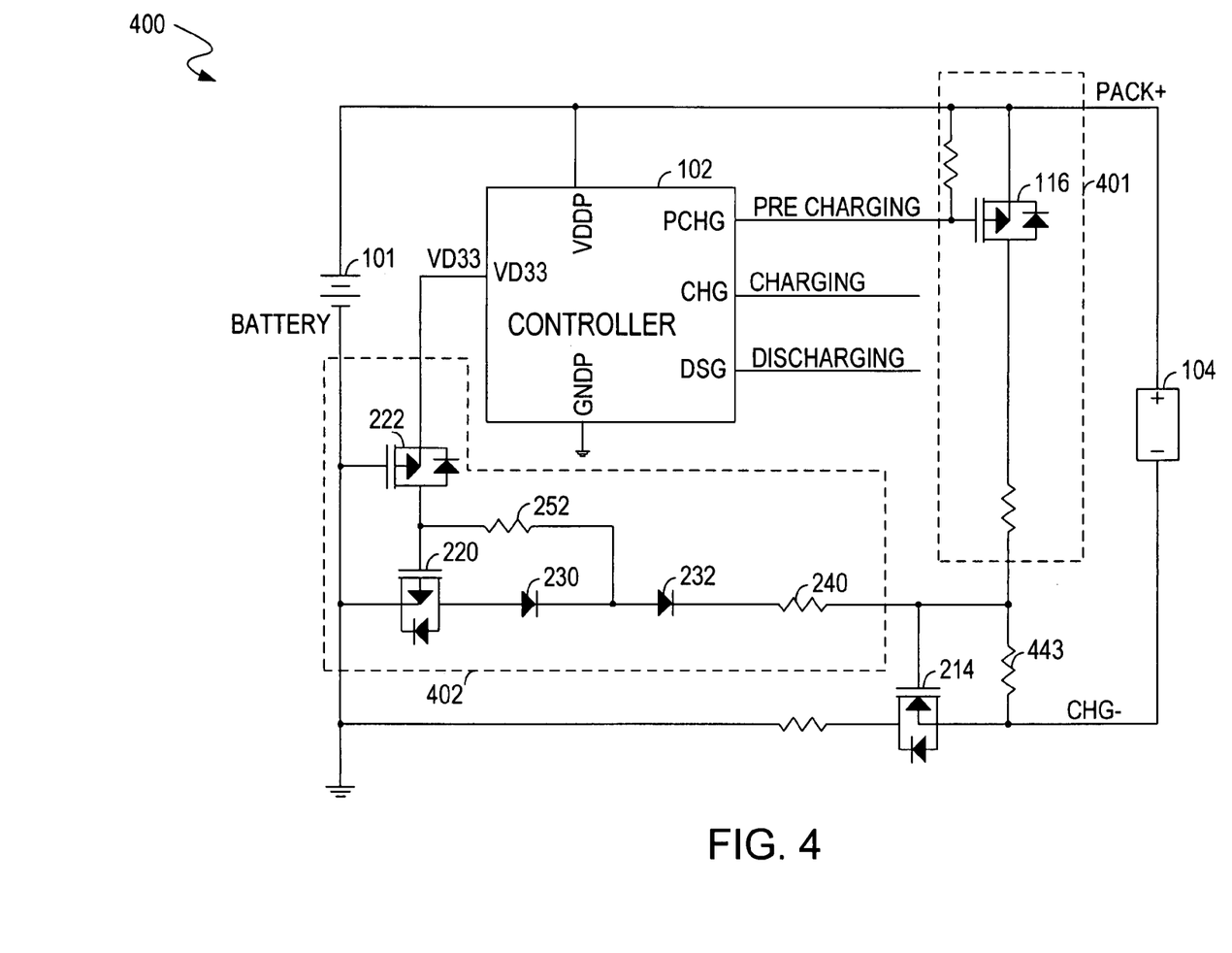
FIG. 4 shows another circuit diagram of a battery pre-charging circuit, in accordance with one embodiment of the present invention.
Figure 5:
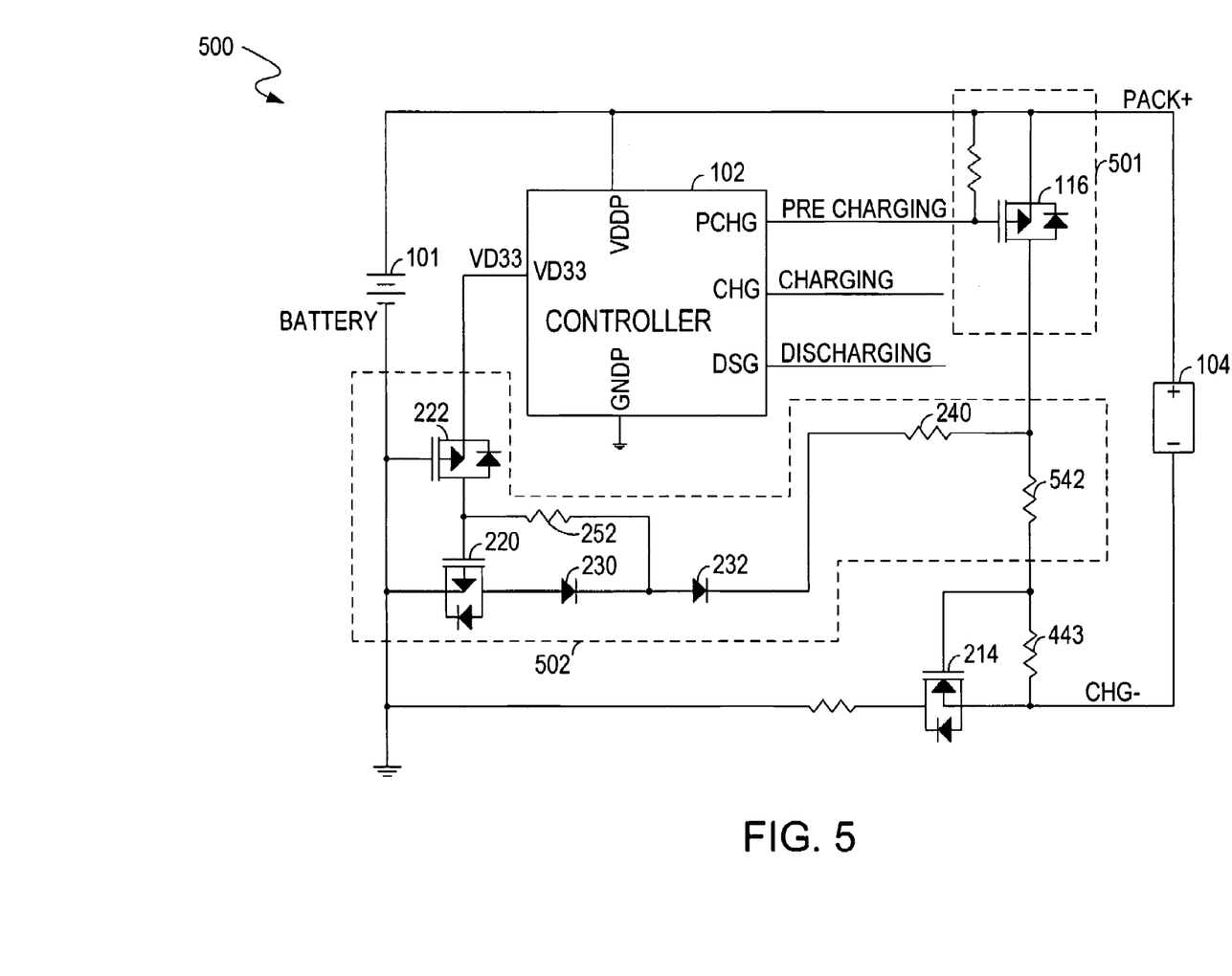
FIG. 5 shows another circuit diagram of a battery pre-charging circuit, in accordance with one embodiment of the present invention.

FIG. 4 shows a circuit diagram of a battery pre-charging circuit 400, in accordance with one embodiment of the present invention. Elements having similar functions as in FIG. 2 and FIG. 3 are labeled the same and will not be repetitively described herein for purposes of brevity and clarity.

Referring to FIG. 4, when the battery voltage is below the first battery voltage level, the supply voltage at terminal VD33 is below the threshold voltage of the second control switch 222. Therefore, the second control switch 222 is off. As such, the gate of the first control switch 220 is coupled to the negative terminal CHG− of the charger 104 via resistor 252, diode 232, resistor 240, and resistor 443. The first control switch 220 is switched on. Therefore, the pre-charging switch 214 is switched on to allow the pre-charging for the battery 101. As such, the low-voltage pre-charging circuit 402 switches on the pre-charging switch 214 when the battery voltage is below the first battery voltage level. The operation of the normal pre-charging circuit 401 is similar to the normal pre-charging circuit 201 in FIG. 2, hence repetitive descriptions are omitted herein for purposes of brevity and clarity.

Advantageously, in one embodiment, the gate-source voltage of the first control switch 220 in FIG. 4 is smaller than the gate-source voltage of the first control switch 220 in FIG. 3 because of the voltage drop across resistors 240 and 443. Thus, breakdown of the first control switch 220 in FIG. 4 can be avoided.

In addition, when the charger 104 is present, there is also a DC path from the terminal VD33 to ground through switch 222, resistor 252, resistor 240 and resistor 443. Referring back to both FIG. 2 and FIG. 3, when the charger 104 is present, there is a DC path from the terminal VD33 to ground through switch 222 and resistor 252. Advantageously, the DC current flowing from the terminal VD33 to ground through switch 222, resistor 252, resistor 240 and resistor 443 in FIG. 4 is much smaller than the DC current flowing from the terminal VD33 to ground through switch 222 and resistor 252 in FIG. 2 and FIG. 3. As such, the power consumption in FIG. 4 is reduced.

FIG. 5 shows a circuit diagram of a battery pre-charging circuit 500, in accordance with one embodiment of the present invention. Elements having similar functions as in FIG. 2, FIG. 3 and FIG. 4 are labeled the same and will not be repetitively described herein for purposes of brevity and clarity.

Referring to FIG. 5, when the battery voltage is below the first battery voltage level, the supply voltage at terminal VD33 is below the threshold voltage of the second control switch (P channel MOSFET) 222. Therefore, the second control switch 222 is off. As such, the gate of the first control switch is coupled to the negative terminal CHG− of the charger 104 via resistor 252, diode 232, resistor 240 and resistor 443. The first control switch (N channel MOSFET) 220 is switched on. Therefore, the pre-charging switch 214 is switched on to allow pre-charging for the battery 101. As such, the low-voltage pre-charging circuit 502 switches on the pre-charging switch 214 when the battery voltage is below the first battery voltage level. The operation of the normal pre-charging circuit 501 is similar to the normal pre-charging circuit in FIG. 2, hence repetitive descriptions are omitted herein for purposes of brevity and clarity.

Referring again to FIG. 5, the DC path from the VD33 terminal to the negative terminal CHG− of the charger in FIG. 5 comprises one more resistor 542 compared to the DC path in FIG. 4. Advantageously, the embodiment in FIG. 5 further reduces the power consumption.

Figure 6:
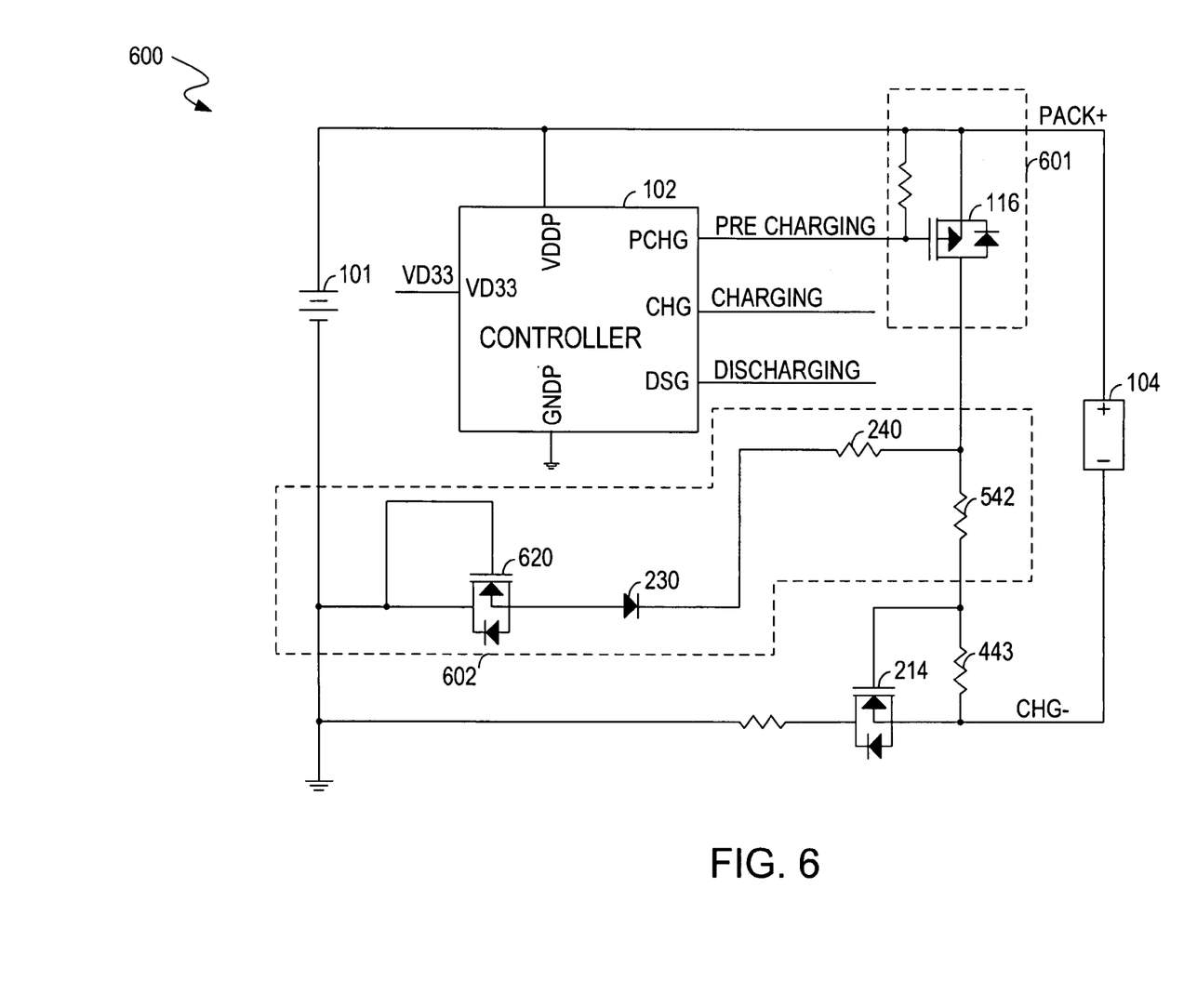
FIG. 6 shows another circuit diagram of a battery pre-charging circuit, in accordance with one embodiment of the present invention.

FIG. 6 shows a circuit diagram of a battery pre-charging circuit 600, in accordance with one embodiment of the present invention. Elements having similar functions as in FIG. 2, FIG. 3, FIG. 4 and FIG. 5 are labeled the same and will not be repetitively described herein for purposes of brevity and clarity.

Referring to FIG. 6, the battery pre-charging circuit 600 comprises a battery 101, a charger 104 coupled to the battery 101, a pre-charging path coupled between the charger 104 and the battery 101 for providing a pre-charging current from the charger 104 to the battery 101, a pre-charging switch 214 coupled to the pre-charging path for conducting the pre-charging path, a controller 102 coupled to the battery 101, a low-voltage pre-charging circuit 602 and a normal pre-charging circuit 601.

The low-voltage pre-charging circuit 602 is coupled between the battery 101 and the pre-charging switch 214 for controlling the pre-charging switch 214. More specifically, the low-voltage pre-charging circuit 602 is configured to switch on the pre-charging switch 214 when the battery voltage is below the first voltage level.

The normal pre-charging circuit 601 is coupled between the controller 102 and the pre-charging switch 214 for controlling the pre-charging switch 214. More specifically, the normal pre-charging circuit 601 is configured to switch on the pre-charging switch 214 when the battery voltage is above the second battery voltage level.

The controller 102 is coupled to said normal pre-charging circuit 601 for controlling the conductance of the normal pre-charging circuit 601. It will be noted that the controller 102 is also used to control the charging switch 112 and the discharging switches 110. The detailed operation of the charging and discharging control are omitted herein for purposes of brevity and clarity.

As described with reference to FIG. 2, the controller 102 is operable when the battery voltage is above the second battery voltage level (e.g., 4.5V for a Lithium-Ion battery pack). In other words, the normal pre-charging circuit 601 conducts when the battery voltage is above the second battery voltage level.

The low-voltage pre-charging circuit 602 conducts when the battery voltage is below the first battery voltage level.

The low-voltage pre-charging circuit 602 comprises a control switch 620 for controlling conductance of the low-voltage pre-charging circuit 601. The control switch 620 is switched on when the battery voltage is below the first voltage level. Therefore, the pre-charging switch 214 will be switched on to conduct current along the pre-charging path in order to pre-charge the battery 101.

In one embodiment, the control switch 620 is an N channel MOSFET. Once the charger 104 is coupled to the battery 101, the source terminal of the control switch 620 is coupled to the negative terminal CHG− of the charger through diode 230, resistor 240, resistor 542, and resistor 443. As long as the difference between the charger voltage $V_{pack}$ and the battery voltage $V_{batt}$ is larger than the sum of the voltage across resistors 240, 542 and 443, diode 230, and the threshold voltage $V_{th}$ of the control switch 620, the control switch 620 will be switched on. In other words, when the battery voltage $V_{batt}$ is below the first voltage level ($V_{pack}$-$V_{240}$-$V_{542}$-$V_{443}$-$V_{230}$-$V_{th}$) the control switch 620 is switched on in one embodiment.

In one embodiment, the pre-charging switch 214 is an N channel MOSFET. When the control switch 620 is switched on, the voltage at the negative terminal CHG− of the charger 104 is negative with respect to the voltage at the gate of the N channel MOSFET 620. Therefore, the pre-charging switch 214 is switched on for conduction along the pre-charging path.

Advantageously, by adjusting the resistance of resistor 240, 542 and 443, and the internal resistance of the switch 116 in FIG. 6, the first battery voltage level may be greater than the second battery voltage level, in one embodiment. As such, there is a certain period that both low-voltage pre-charging circuit 602 and normal pre-charging circuit 601 are conducted to switch on the pre-charging switch 214, which leads to a smooth transition between the low-voltage pre-charging and normal pre-charging operations.

In operation, when the battery voltage is above the second battery voltage, the normal pre-charging circuit 601 is conducts current for controlling said pre-charging switch. When the battery voltage is below the first battery voltage level, the low-voltage pre-charging circuit 602 is conducts current for controlling a pre-charging switch.

As described above, the controller 102 is operable when the supply voltage at terminal VD33 is above a supply voltage threshold, e.g., 3.3V. As long as the battery voltage is above the second battery voltage (e.g., 4.5V for a Lithium-Ion battery pack), the controller 102 is able to maintain the supply voltage at terminal VD33 above the supply voltage threshold (e.g., 3.3V). As such, the controller 102 will sink enough current at terminal PCHG to switch on the switch 116 in the normal pre-charging circuit 601. Once switch 116 is switched on, the pre-charging switch 214 will be switched on. The pre-charging path is conducted through the body diode 212 and the pre-charging switch 214. Therefore, the battery 101 is pre-charged by the normal pre-charging circuit 601 when the battery voltage is above the second battery voltage.

In contrast, when the battery voltage is below the second battery voltage (e.g., 4.5V for a Lithium-Ion battery pack), the supply voltage at terminal VD33 is below the supply voltage threshold (e.g., 3.3V). The controller 102 is not operable when the supply voltage at terminal VD33 is below the supply voltage threshold (e.g., 3.3V). As such, the battery 101 cannot be pre-charged by the normal pre-charging circuit 601 since the controller 102 is not operable.

As described above, the controller 102 is not operable and the battery 101 cannot be pre-charged by the normal pre-charging circuit 601 when the battery voltage is too low. However, as long as the battery voltage is below the first supply voltage, the battery 101 can be pre-charged by the low-voltage pre-charging circuit 602.

More specifically, when the battery voltage is below the first battery voltage (e.g., $V_{pack}$-$V_{240}$-$V_{542}$-$V_{443}$-$V_{230}$-$V_{th}$), the control switch 620 is switched on. In one embodiment, the pre-charging switch 214 is an N channel MOSFET. When the control switch 620 is switched on, the voltage at the negative terminal CHG− of the charger 104 is negative with respect to the voltage at the gate of the control switch 620. Therefore, the pre-charging switch 214 is switched on for conducting the pre-charging path. Therefore, the battery 101 is pre-charged by the low-voltage pre-charging circuit 601 when the battery voltage is below the first battery voltage.

Advantageously, in one embodiment, when the battery voltage drops to zero, the low-voltage pre-charging circuit 602 is still able to switch on the pre-charging switch 214 to pre-charge the battery 101.

Figure 7:
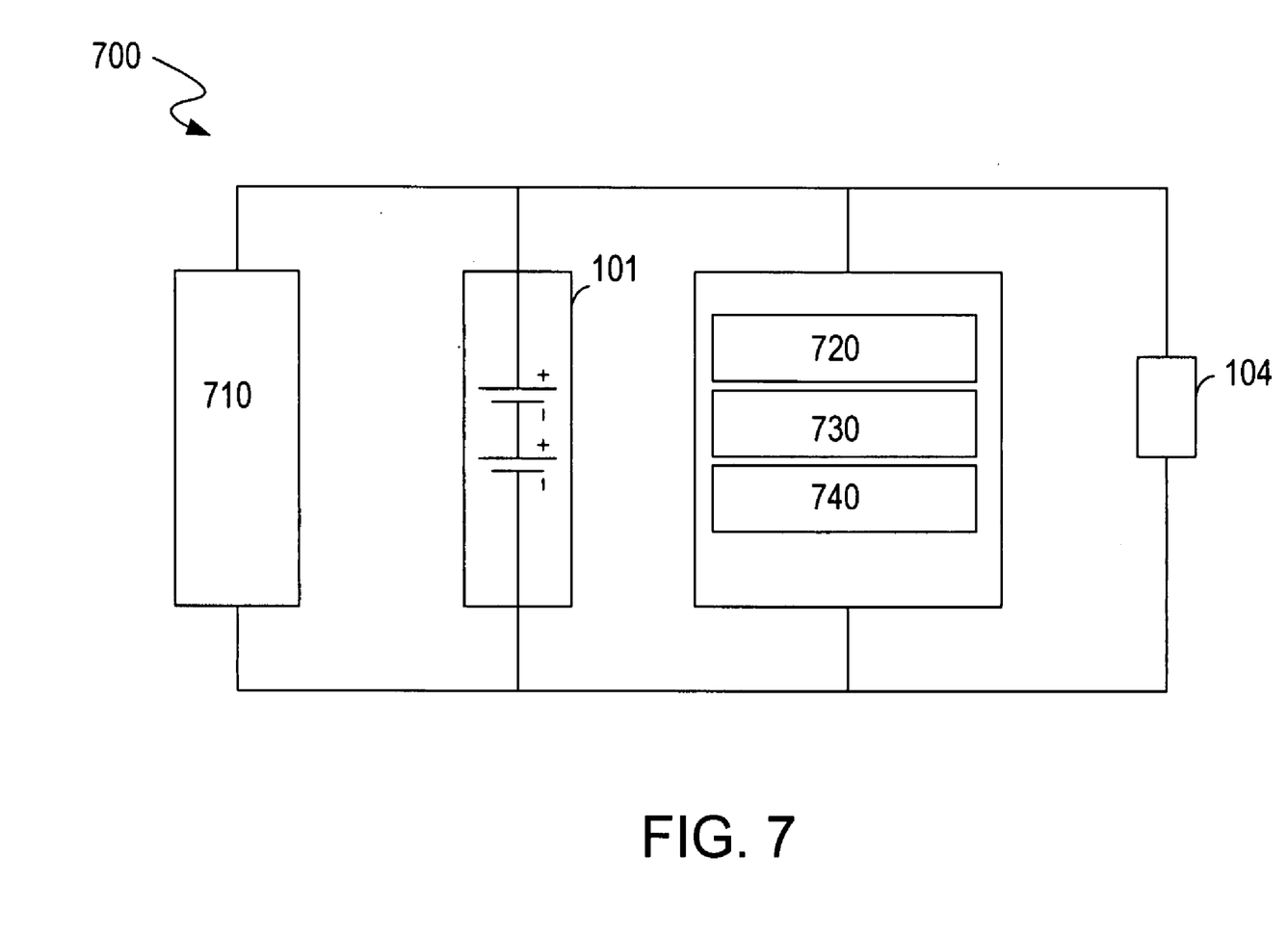
FIG. 7 is a block diagram of an electronic device according to an embodiment of the present invention.

FIG. 7 shows a block diagram of a electronic device 700, in accordance with one embodiment of the present invention. The electronic device 700 comprises a load 710, a battery 101 coupled to the load 710 for providing power to the load 710, a charger 104 coupled to the battery 101, a charging circuit 720 coupled to the battery 101 for providing the charging current to the battery 101, a discharging circuit 730 coupled to the battery 101 for providing the discharging current to the battery 101, and a pre-charging circuit 740 coupled to the battery 101 for providing a pre-charging current to the battery 101.

Furthermore, the pre-charging circuit 740 is analogous to the pre-charging circuit as described in FIGS. 2, 3, 4, 5 and 6, in accordance with one embodiment. For example, in one embodiment, the pre-charging circuit 740 in FIG. 7 may comprise a pre-charging path coupled between the charger 104 and the battery 101 for providing a pre-charging current from the charger 104 to the battery 101, a pre-charging switch 214 coupled to the pre-charging path for conducting the pre-charging path, and a low-voltage pre-charging circuit 202 as shown in FIG. 2. The pre-charging circuit 740 may further comprise a normal pre-charging circuit 201 as shown in FIG. 2. Detailed description of the pre-charging circuit in FIG. 2 has been made, hence will not be repetitively described herein for purposes of brevity and clarity.

Accordingly, the present invention provides a battery pre-charging circuit that is able to perform pre-charge when the battery voltage is low or even zero. As such, the present invention provides low-voltage pre-charging to the battery when the battery voltage is low and normal pre-charging when the controller is operable.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A pre-charging circuit comprising:
   a pre-charging path coupled between a charger and a battery for providing a pre-charging current from said charger to said battery;
   a pre-charging switch coupled to said pre-charging path for conducting said pre-charging current along said pre-charging path;
   a low-voltage pre-charging circuit coupled to said pre-charging switch for controlling said pre-charging switch, wherein said low-voltage pre-charging circuit is configured to switch on said pre-charging switch when said battery's voltage is below a first voltage level in order to provide said pre-charging current to said battery and to switch off said pre-charging switch when said battery's voltage is above said first voltage level; and
   a normal pre-charging circuit coupled to said pre-charging switch for controlling said pre-charging switch, wherein said normal pre-charging circuit is configured to switch on said pre-charging switch when said battery's voltage is above a second voltage level in order to provide said pre-charging current to said battery and to switch off said pre-charging switch when said battery's voltage is below said second voltage level so that said pre-charging current to said battery is cut off, wherein said first and second voltage levels are different from each other.

2. The pre-charging circuit as claimed in claim 1, further comprising a controller coupled to said normal pre-charging circuit for causing said normal pre-charging circuit to conduct when said controller is operable, wherein said controller is operable when said battery's voltage is above said second voltage level.

3. The pre-charging circuit as claimed in claim 2, wherein said low-voltage pre-charging circuit conducts when said battery's voltage is below said first voltage level.

4. The pre-charging circuit as claimed in claim 3, wherein said low-voltage pre-charging circuit comprises a first control switch for controlling conductance of said low-voltage pre-charging circuit.

5. The pre-charging circuit as claimed in claim 4, wherein said low-voltage pre-charging circuit further comprises a second control switch coupled to said first control switch for controlling said first control switch.

6. The pre-charging circuit as claimed in claim 5, wherein said controller comprises a power supply terminal coupled to said second control switch for controlling said second control switch, wherein a power supply from said power supply terminal is provided by said battery.

7. The pre-charging circuit as claimed in claim 4, wherein said first control switch is switched on when said battery's voltage is below said first voltage level.

8. The pre-charging circuit as claimed in claim 6, wherein said second control switch is switched off when said battery's voltage is below said first voltage level.

9. A pre-charging circuit comprising:
   a pre-charging path coupled between a charger and a battery for providing a pre-charging current from said charger to said battery;
   a pre-charging switch coupled to said pre-charging path for conducting said pre-charging current along said pre-charging path;
   a low-voltage pre-charging circuit coupled between said battery and said pre-charging switch for controlling said pre-charging switch, wherein said low-voltage pre-charging circuit is configured to switch on said pre-charging switch when said battery's voltage is below a first voltage level in order to provide said pre-charging current to said battery and to switch off said pre-charging switch when said battery's voltage is above said first voltage level;
   a normal pre-charging circuit coupled between said controller and said pre-charging switch for controlling said pre-charging switch, wherein said normal pre-charging circuit is configured to switch on said pre-charging switch when said battery's voltage is above a second voltage level in order to provide said pre-charging current to said battery and to switch off said pre-charging switch when said battery's voltage is below said second voltage level so that said pre-charging current to said battery is cut off, wherein said first and second voltage levels are different from each other; and
   a controller coupled to said normal pre-charging circuit, wherein said controller causes said normal pre-charging circuit to conduct when said controller is operable, wherein said controller is operable when said battery's voltage is above said second voltage level and inoperable when said battery's voltage is below said second voltage level.

10. The pre-charging circuit as claimed in claim 9, wherein said first voltage level is less than said second voltage level.

11. The pre-charging circuit as claimed in claim 10, wherein said low-voltage pre-charging circuit conducts when said battery's voltage is less than said first voltage level.

12. The pre-charging circuit as claimed in claim 11, wherein said low-voltage pre-charging circuit comprises a control switch for controlling a conduction of said low-voltage pre-charging circuit.

13. The pre-charging circuit as claimed in claim 12, wherein said control switch is switched on when said battery's voltage is less than said second voltage level.

14. A method for pre-charging comprising:
    switching on a pre-charging switch to conduct a pre-charging current from a low-voltage pre-charging circuit when a battery's voltage is below a first voltage level and switching off said pre-charging switch when said battery's voltage is above said first voltage level;
    switching on said pre-charging switch to conduct said pre-charging current from a normal pre-charging circuit when said battery's voltage is above a second voltage level and switching off said pre-charging switch to cut off said pre-charging current when said battery's voltage is below said second voltage level, wherein said first and second voltage levels are different from each other; and
    conducting current along a said pre-charging path comprising said pre-charging switch to provide a pre-charging current to said battery.

15. The method as claimed in claim 14, further comprising:
    switching on a first control switch in said low-voltage pre-charging circuit to cause said low-voltage pre-charging circuit to conduct when said battery's voltage is below said first voltage level.

16. The method as claimed in claim 15, further comprising:
    switching off a second control switch in said low-voltage pre-charging circuit to cause said first control switch to conduct when said battery's voltage is below said first voltage level.

17. An electronic device comprising:
    a load;
    a battery coupled to said load for providing power to said load;

a charger coupled to said battery;
a charging circuit coupled to said battery for providing a charging current to said battery;
a discharging circuit coupled to said battery for providing a discharging current to said battery; and
a pre-charging circuit coupled to said battery for providing a pre-charging current to said battery, said pre-charging circuit comprising:
a pre-charging path coupled between said charger and said battery for providing said pre-charging current from said charger to said battery;
a pre-charging switch coupled to said pre-charging path for conducting said pre-charging current along said pre-charging path;
a low-voltage pre-charging circuit coupled to said pre-charging switch for controlling said pre-charging switch, wherein said low-voltage pre-charging circuit is configured to switch on said pre-charging switch when said battery's voltage is below a first voltage level in order to provide said pre-charging current to said battery and to switch off said pre-charging switch when said battery's voltage is above said first voltage level; and
a normal pre-charging circuit coupled to said pre-charging switch for controlling said pre-charging switch, wherein said normal pre-charging circuit is configured to switch on said pre-charging switch when said battery's voltage is above a second voltage level in order to provide said pre-charging current to said battery and to switch off said pre-charging switch when said battery's voltage is below said second voltage level so that said pre-charging current to said battery is cut off, wherein said first and second voltage levels are different from each other.

* * * * *